United States Patent [19]

Young

[11] Patent Number: 4,947,681

[45] Date of Patent: Aug. 14, 1990

[54] SYSTEM AND METHOD FOR FACILITATING CORRECT GEAR MESHING AND CLUTCH ENGAGEMENT IN VEHICLES

[75] Inventor: Jonathan Young, Fremont, Calif.

[73] Assignee: Paccar Inc., Bellevue, Wash.

[21] Appl. No.: 351,426

[22] Filed: May 12, 1989

[51] Int. Cl.$^5$ ............................................ G01M 19/00
[52] U.S. Cl. ...................................... 73/118.1; 73/510
[58] Field of Search ................ 73/118.1; 340/441, 456

[56] References Cited

U.S. PATENT DOCUMENTS

| | | | |
|---|---|---|---|
| 3,922,910 | 12/1975 | Dickinson | 73/118.1 |
| 4,179,938 | 12/1979 | Schramm | 73/510 |

FOREIGN PATENT DOCUMENTS 158935  2/1921  United Kingdom .................. 73/510

*Primary Examiner*—Jerry W. Myracle

*Attorney, Agent, or Firm*—Flehr, Hohbach, Test, Albritton & Herbert

[57] ABSTRACT

A technique for facilitating correct meshing of transmission gears and smooth clutch engagement in vehicles that require driver synchronization of speeds of transmission mating gears. The technique includes an arrangement for ascertaining vehicle road speed, an arrangement for automatically selecting a recommended gear based on the vehicle road speed and informing the driver of the selection. An arrangement is also provided for calculating the ideal engine rpm based on the selected recommended gear and informing the driver of the ideal rpm. During operation, the operator adjusts the engine rpm to substantially match said ideal engine rpm to smoothly mesh the vehicle in the recommended gear. In an alternative embodiment, the dual needle tachometer is used to display actual engine crankshaft and transmission input shaft speeds respectively to facilitate smooth clutch engagement in the vehicle.

9 Claims, 5 Drawing Sheets

SYSTEM AND METHOD FOR FACILITATING CORRECT GEAR MESHING AND CLUTCH ENGAGEMENT IN VEHICLES

The present invention relates generally to techniques for monitoring engine and drive shaft rpm in a vehicle. More particularly, one embodiment of the invention relates to a system and method to select and display a recommended gear and recommended engine rpm for facilitating smooth gear meshing in a vehicle coasting in neutral based on the vehicle's road speed, while a second embodiment of the invention relates to a dual needle tachometer to facilitate smooth clutch engagement.

BACKGROUND OF THE INVENTION

Referring to FIG. 1, a vehicle drive train having an unsynchronized transmission pointing in the forward direction as designated by the arrow 10 as shown. The drive train 20 includes an engine 22, a transmission 24, a clutch assembly 26 mechanically positioned between the engine and transmission, an axle 28 and a drive shaft 30 mechanically positioned between the transmission 24 output and the axle 28. In addition, a clutch pedal 30 and a gear shift lever 32 located in the driver's cab are mechanically connected to (not shown) and adapted to control the clutch assembly 26 and transmission 24 respectively in a well known manner.

Engine 22 includes a crankshaft 34 which can be considered to extend into the clutch assembly 26. A first disc 35 permanently attached to the crank shaft is mechanically positioned in the forward portion of the clutch assembly 26. The transmission 24 includes a input shaft 36 which extends from the rear into the clutch assembly 26. A second disc 37 is permanently attached to the input shaft and is mechanically positioned in the rearward portion of the clutch assembly 26, opposed the first disc 35. The clutch pedal 30 allows the driver to mechanically control the relative position of the discs 35 and 37 with respect to one another. When the clutch pedal 30 is in the up position, the clutch assembly 26 physically engages the two discs together, and the crankshaft 34 drives the input shaft 36 at the engine speed. When the driver pushes the clutch pedal 30 to the floor of the cab to disengage the clutch, the clutch assembly acts to physically separate the discs. The front disc 35 will rotate at engine 22 rpm, while the rearward disc 37 will rotate at the same speed as the input shaft 36.

To re-engage the clutch, it is mechanically necessary for the two shafts to be rotating at substantially equal rates to effectuate a smooth coupling between the two discs 35 and 37, respectively. This may require the driver to rev (or slow down) the engine speed so that the engine shaft rpm matches the transmission shaft rpm. This procedure is difficult, however, because the transmission shaft rate at the uncoupling is unknown because the single needle engine tachometer of the prior art no longer indicates the transmission rpm. The driver is required to rely solely on his experience at matching the engine speed with the transmission speed. Accordingly, a dual needle tachometer for indicating the engine and the transmission input shaft rpms on a single display face is needed to aid clutch engagement when the transmission is in gear.

Another problem confronting drivers is to effectuate smooth gear meshing for a vehicle coasting in neutral, based on the vehicle's road speed. By way of background, the operation of truck transmissions is provided. The transmission 24 is an unsynchronized gear box comprising an assembly of the transmission input shaft 36 and a gear train 38 comprising a multiplicity of paired gears mechanically positioned in the gear box. Each gear pair includes a first gear driven by the input shaft 36 and a second gear driven by the rear road wheels, through the drive axle and drive shaft 30, behind the transmission. When the driver places gear shift lever 32 into a particular gear position and engages the clutch, the first gear of the selected gear pair, mechanically coupled to the input shaft 36 rotates at the input shaft 36 rpm. The second gear of the selected gear pair, mechanically coupled to the drive shaft 30, maintains an rpm proportional to the vehicle's road speed. To effectuate vehicle movement, the gear pair must be meshed together to mechanically link the input shaft 36 driven by the crankshaft 34 to the drive shaft 30 by a meshing of the selected gear pair. The two gears must be rotating at substantially the same tangential speed to effectuate a smooth meshing of the mated gear pair. In other words, the driver is required to adjust the engine rpm to cause the particular gear pair to run at "synchronized" speed. If the engine speed is not effectively adjusted, the paired gears grind when meshing, or cannot be meshed at all.

Accordingly, shifting gears in a vehicle having an unsynchronized transmission includes the following steps:
 (1) disengaging the clutch, thereby physically separating the mechanical link between the crankshaft 34 and transmission input shaft 36;
 (2) shifting the transmission 24 into neutral, to unmesh the gear pair;
 (3) engaging the clutch, thereby driving the input shaft and the first gear at rate equal to the engine rpm;
 (4) adjusting the engine rpm (i.e., revs up the engine for downshifting, or let the engine speed coast down if upshifting) so that the pair of gears to be meshed rotate at substantially their synchronized speed
 (5) disengaging the clutch;
 (6) shifting the transmission into gear to effectuate smooth gear meshing; and
 (7) engaging the clutch.

This procedure is difficult because the drive shaft rpm after clutch disengagement is unknown. The prior art single needle engine speed tachometer indicates only engine rpm and not drive shaft 30 rpm. The driver is required to rely solely on his experience in adjusting the engine speed which is indicated on the single needle tachometer, to effect meshing of transmission gears.

The prior art, as described above, has additional limitations. A mismatch in engine and transmission speeds due to an inaccurate estimation of drive shaft speed will cause the transmission gears to be unmeshable. Furthermore, repeated inaccurate estimations of the required engine rpm can lead to a host of long term mechanical difficulties. Namely, it decreases clutch life and causes damage to the transmission and drive shafts. When the driver fails to achieve transmission gear meshing, the vehicle can coast only, and motive force as well as engine braking is unavailable. A dual needle tachometer having a first needle for indicating engine rpm and a second needle for indicating transmission input shaft speed will aid drivers in matching engine and transmission speeds to facilitate smooth clutch engagement.

SUMMARY OF THE INVENTION

Accordingly, it is a primary object of the present invention to provide a dual needle tachometer for indicating the engine and the transmission input shaft rpm on a single display face to aid clutch engagement when the transmission is in gear.

Another object of the invention is to provide a system and a method for automatically displaying a recommended gear and engine rpm to effectuate smooth gear meshing for a vehicle coasting in neutral, based on the vehicle road speed.

To achieve the foregoing and other objects and in accordance with the purpose of the present invention, there is provided a system and a method to facilitate correct gear selection and correct engine rpm adjustment to effect meshing of the transmission gears in vehicles that require substantially correct engine rpm for successful gear meshing. The system and method includes a means for ascertaining vehicle road speed, means for automatically selecting a recommended gear based on the vehicle road speed and informing the driver of the selection. A means is also provided for calculating the ideal engine rpm based on the selected recommended gear and informing the driver of the ideal rpm. During operation, the operator adjusts the engine rpm to substantially match the ideal engine rpm to smoothly mesh the transmission gears. In an alternative embodiment, the dual needle tachometer is used to display actual engine crankshaft and transmission input shaft speeds respectively to facilitate in smooth clutch engagement in the vehicle.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENT

Figure 1:
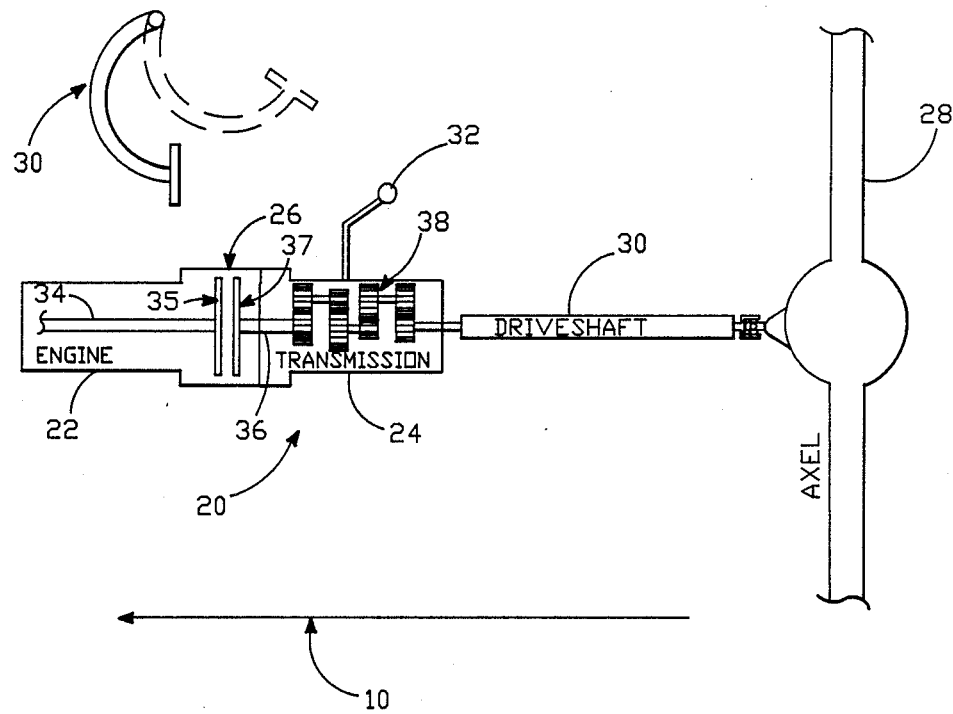
FIG. 1 shows a vehicle drive train having an unsynchronized transmission shown pointing in the forward direction as designated by the arrow 10 according to the prior art.
Figure 2:
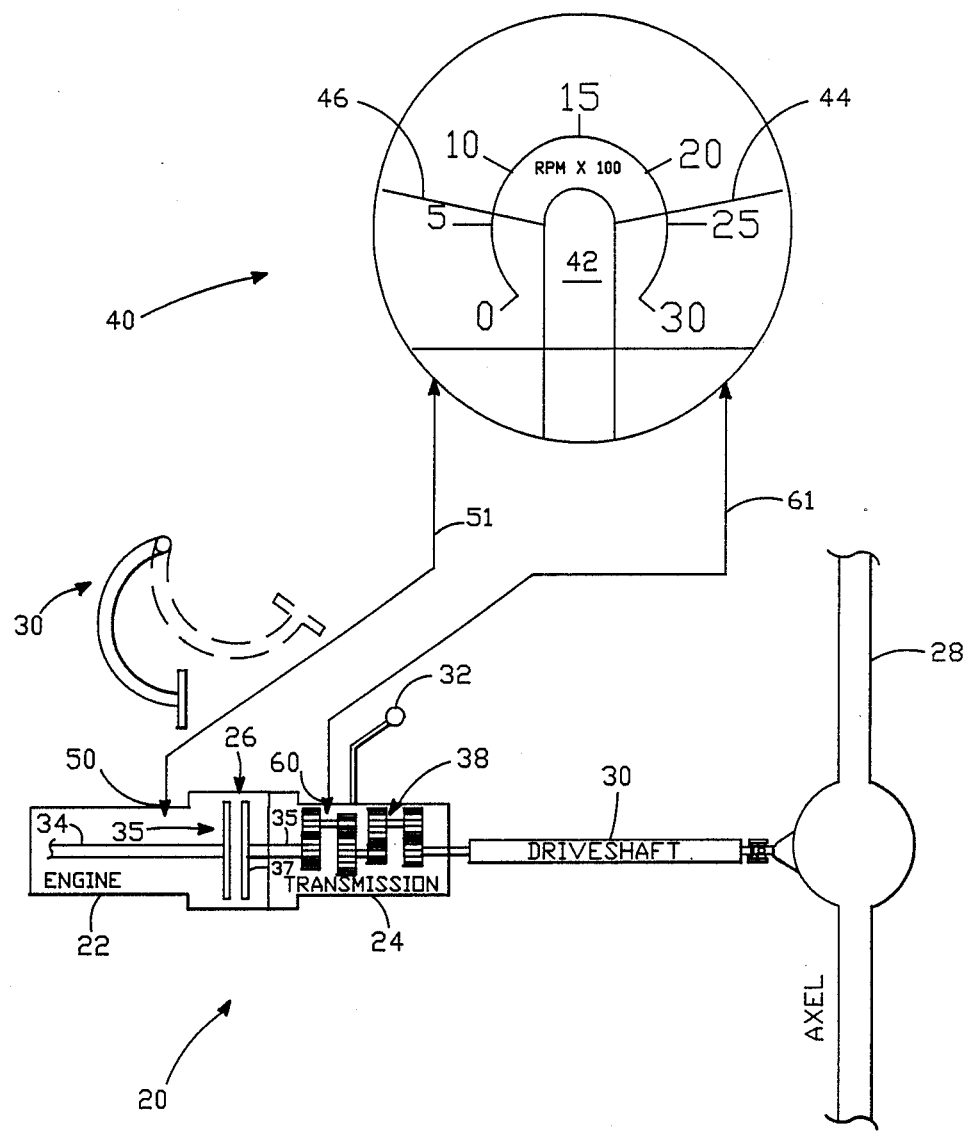
FIG. 2 diagrammatically illustrates a dual needle tachometer connected to the vehicle's drive train of FIG. 1 for displaying engine rpm and transmission input shaft rpm according to an embodiment of the present invention.

Reference is initially made to FIG. 2 which shows a dual needle tachometer 40 connected to the vehicle drive train 20 of FIG. 1. Inasmuch as the drive train 20 operation has been discussed in detail in the Background of the Invention, the following discussion is directed to the dual needle tachometer 40 operation. The dual needle tachometer 40 is specifically designed to aid the driver in matching crankshaft 34 and transmission input shaft 36 speeds to improve smooth clutch engagement according to one embodiment of the present invention.

The tachometer 40 includes a display face 42, a first indicating needle 44 and a second indicating needle 46 visually distinguishable from the first needle arranged on the display face 42. The first and second needles display engine crankshaft 34 and transmission input shaft 36 rpm respectively in a range from a minimum of 0 rpm to a maximum of 3,000 rpm. The first indicating needle 44 is readily distinguishable from the second indicating needle 46 to reduce the time the driver must glance at the tachometer to determine engine rpm and transmission input shaft rpm. For example, the needles may be of different color and/or size.

To accomplish engine rpm display, a first sensor 50 is mounted inside the engine block 22 and is adapted to sense crankshaft 34 rpm and to generate an engine rpm signal in response thereto. A first cable 51, connected between the first sensor 50 and the tachometer 40, is responsible for transmitting the engine rpm signal to the tachometer. The first indicating needle 44 displays the engine rpm in response to the engine rpm signal. This type of arrangement is well known in the art. A second readily providable sensor 60 is mounted inside the transmission 24 and is adapted to sense input shaft 36 rpm and to generate an rpm signal in response thereto. A second cable 61, connected between the second sensor 60 and the tachometer 40, is responsible for transmitting the input shaft rpm signal to the tachometer. The second indicating needle 62 displays the input shaft 36 rpm in response to the transmission rpm signal. In an alternative embodiment, the sensors may be mounted in the clutch assembly. Inasmuch as the sensing, transmitting and the display of shaft rpm on a tachometer is well known in the art, any one of a number of known sensing and transmitting means may be used, including, but not limited to electronic, mechanical and visual.

During operation of the embodiment as shown in FIG. 2, the needles 44 and 46 indicate the same rpm for the crankshaft 34 and the input shaft 36 respectively when the clutch 30 is engaged. When the clutch is disengaged, the position of the first needle 44 relative to the position of the second needle 46 indicates the speed or rpm differential across the clutch. To use the dual needle tachometer 40 to facilitate smooth clutch engagement, the driver revs the engine until the first needle 44 is in substantially the same position as the second needle 46. This indicates a matching of the crankshaft 34 and the input shaft 36 rpm, and hence permits smooth engagement of the clutch.

Figure 3:
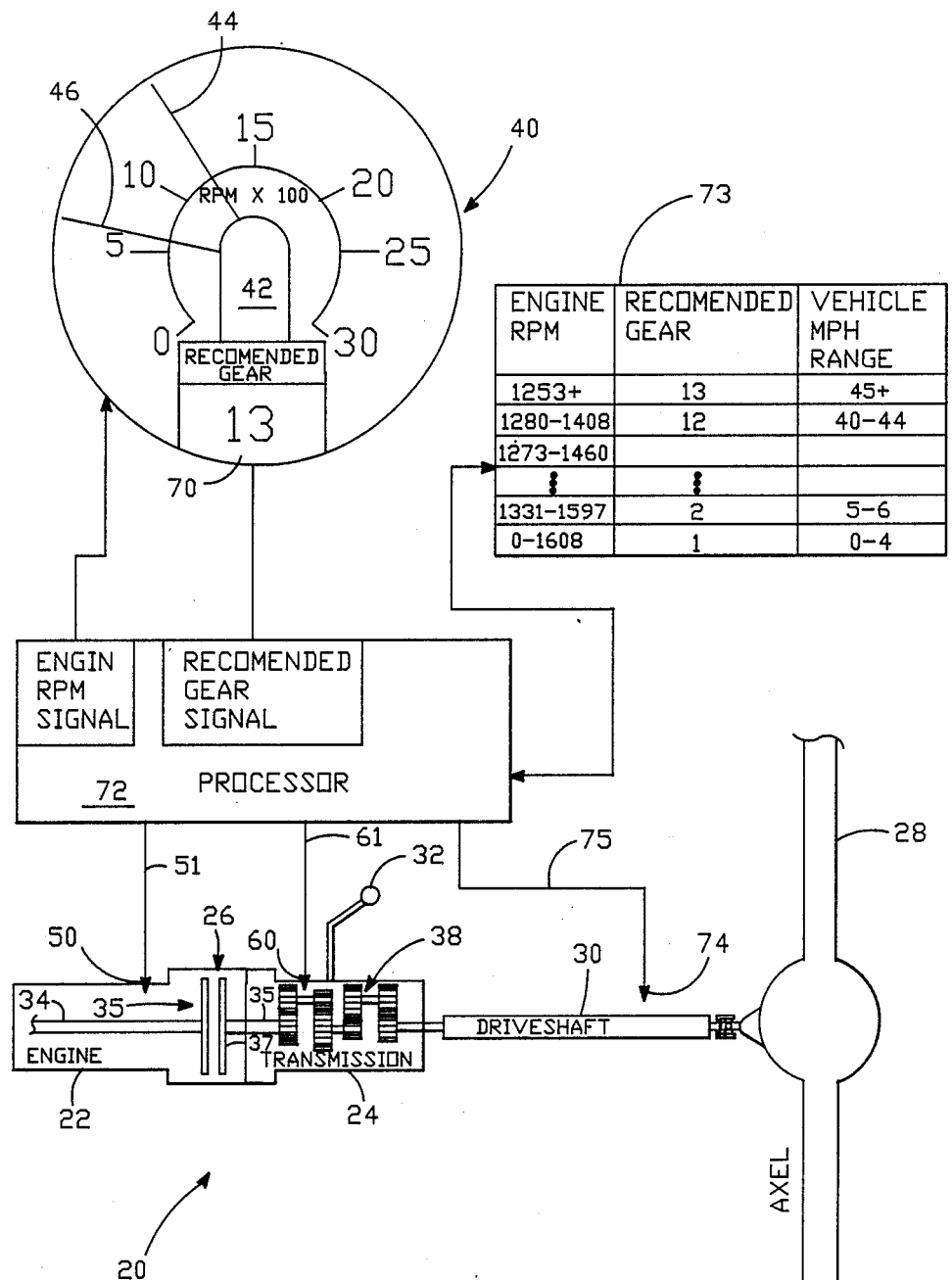
FIG. 3 diagrammatically illustrates a dual needle tachometer system connected to the vehicle drive train shown in FIG. 1, further including a processor for calculating and displaying on the tachometer a recommended engine rpm and recommended transmission gear to engage the vehicle in based on the vehicle's road speed, according to a second embodiment of the present invention.

Referring now to FIG. 3, an alternative embodiment of the dual needle tachometer 40 having a "recommended gear" display 70 on the tachometer face is shown connected to the drive train 20 of FIG. 1. The recommended gear display 70 provides the operator with the proper gear selection in situations where the vehicle is coasting and the transmission is in the neutral position. A readily providable processor 72 and memory 73 are adapted to select a recommended gear based on the current vehicle road speed and to generate a recommended gear signal for display 70. Data used for selecting a recommended gear is stored in memory 73. The data includes a tabulated list of engine rpm ranges, wherein each range corresponds to a recommended gear and road speed range. In the preferred embodiment, a recommended gear is provided for a number of ranges of expected vehicle road speeds.

To provide the processor with information to select the recommended transmission gear and engine rpm, a speed sensor 74 is adapted to sense the speed movement of the vehicle by measuring drive shaft rotation and to generate a signal indicative of road speed in response thereto. The processor 72 is electrically connected to receive the speed signal via electrical cable 75. The processor peruses the engine rpm ranges table in memory, and determines which range the sensed vehicle speed falls into. Once a particular range is ascertained, the corresponding gear is selected as the recommended gear. For example, with a vehicle speed of 45 mph or greater, thirteenth gear is recommended. For vehicle road speed between 40 and 44 mph, twelfth gear is selected, etc. Processor 72 generates the recommended gear signal for display on the digital display 70.

In addition, the processor 72 is adapted to select a recommended engine rpm for the recommended gear and displays that rpm on the dual needle tachometer 40 to facilitate smooth gear meshing. To accomplish this function, the transmission 34 gear ratios for every gear shift lever position are stored in processor memory 73. Once the vehicle speed has been determined and a recommended gear has been selected, the processor calculates the recommended engine rpm for smooth gear meshing and clutch engagement by multiplying the drive shaft rpm by the gear ratio of the selected gear (the drive shaft rpm is proportional to vehicle speed.) The processor thereafter generates the recommended engine rpm signal to control the position of the recommended engine rpm indicating needle 44 on tachometer 40. For instance, if the vehicle is coasting at 30 mph, the tenth gear is recommended, the processor 72 adjusts the position on the tachometer face 36 to indicate the engine rpm for engagement into tenth gear is 1286 rpm.

During operation of the embodiment of FIG. 3, and in the specific situation where the vehicle is coasting with its transmission in the neutral position, the processor selects and displays a recommended gear and adjusts indicating needle 44 to display the ideal engine rpm to facilitate smooth engagement into the selected gear. Hence, the driver adjusts engine rpm per the recommendation, then puts his foot down on the clutch pedal and shifts the transmission into gear. Smooth re-engagement of the clutch is then accomplished when the driver lifts his foot off the clutch pedal.

Figure 4:
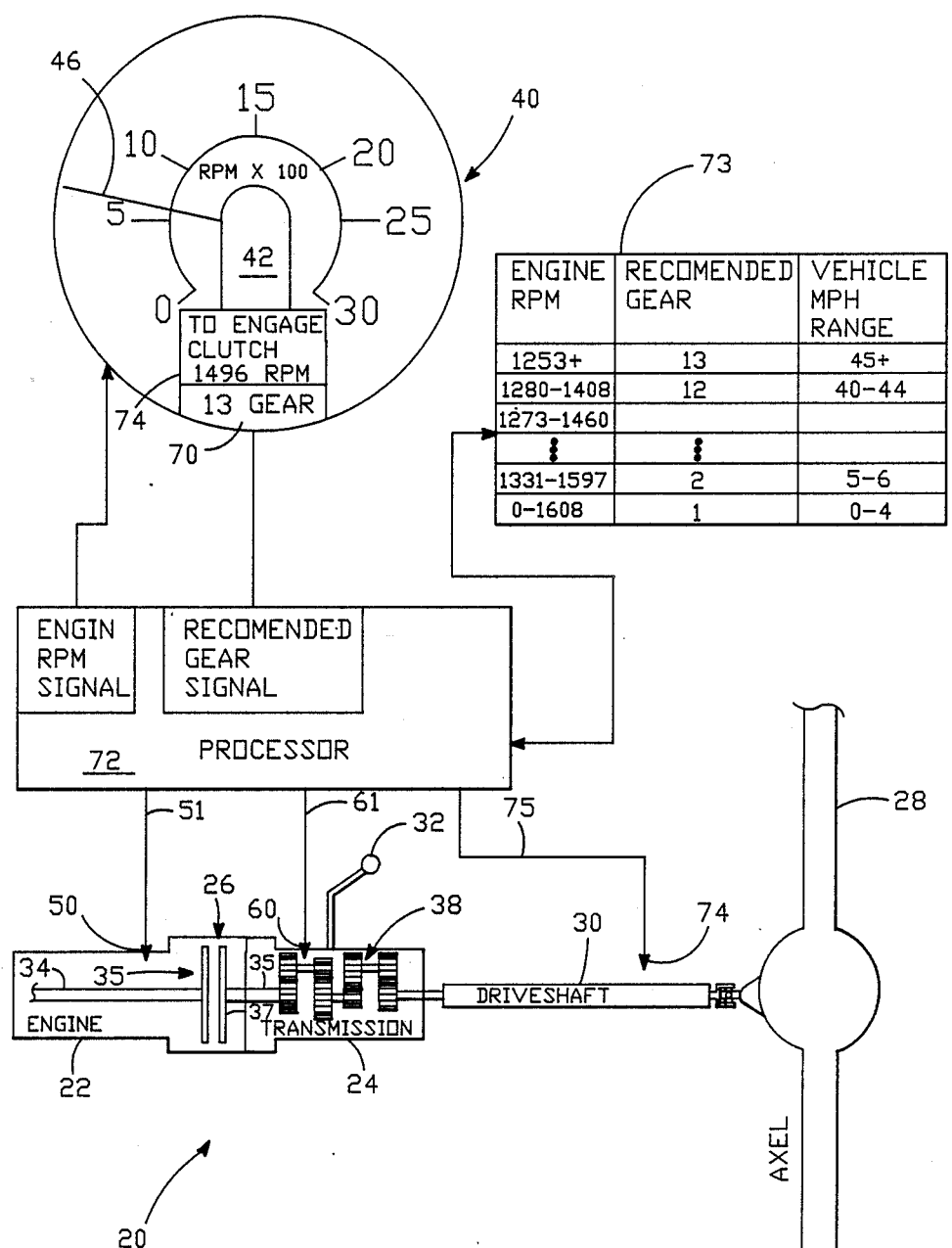
FIG. 4 shows the tachometer system of FIG. 3 replaced by a single needle tachometer having the recommended engine rpm needle replaced by a rolling number rpm digital display according to the present invention.

Referring now to FIG. 4, the tachometer system of FIG. 3 is modified by replacing the recommended engine rpm needle 44 with a rolling number engine rpm digital display 74 according to an alternative embodiment of the present invention. The operation of the embodiment of FIG. 4 is identical to that of FIG. 3, except the driver is required to match the engine rpm with the digital rpm value appearing on display 74 to effectuate smooth coupling.

Figure 5:
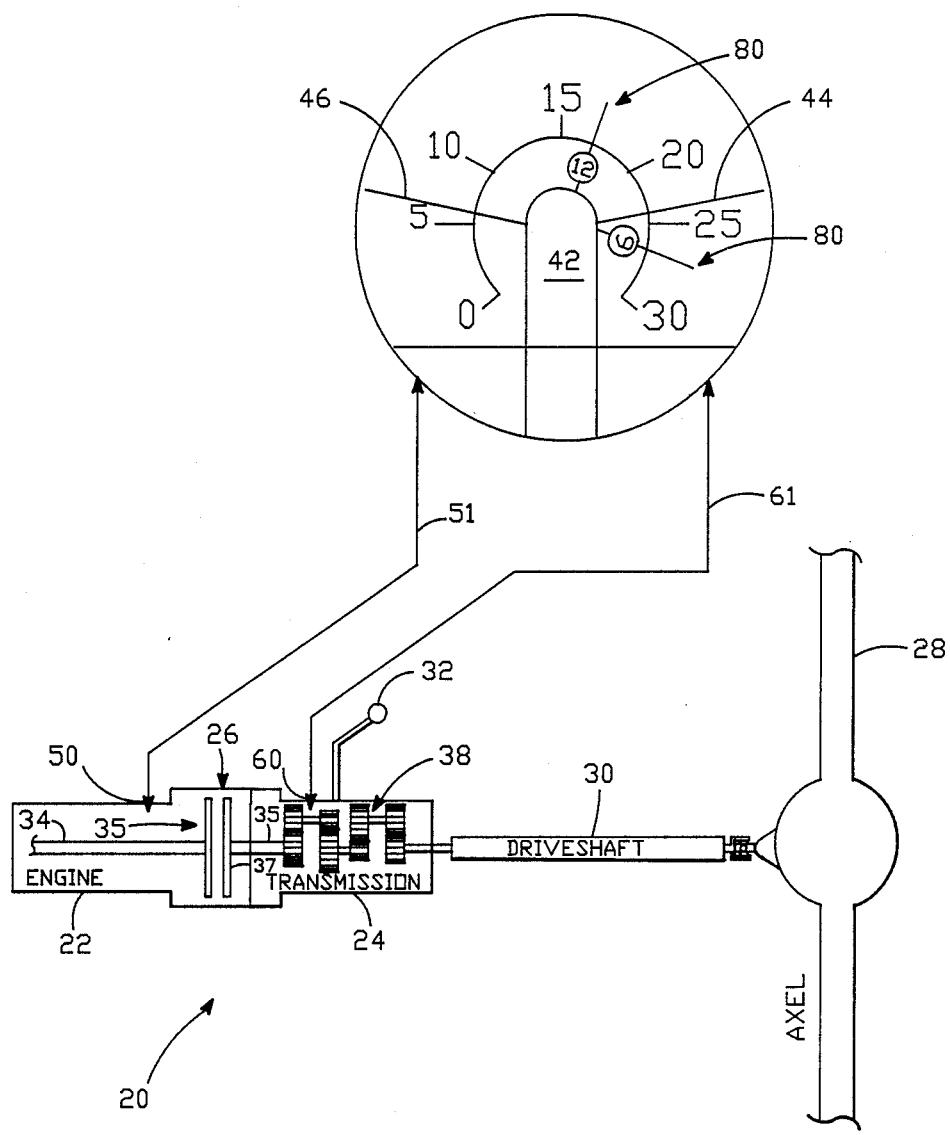
FIG. 5 shows the dual needle tachometer and processor of FIG. 3 replaced by a tachometer having a single engine rpm indicating needle and plurality of indicating needles for indicating engine rpm at selected gears according to a low cost embodiment of the present invention.

FIG. 5 shows the dual needle tachometer and processor of FIG. 2 with the addition of a plurality of static gear engagement indicating needles 80 for indicating the engine rpm at selected gears, according to another embodiment of the present invention. The position of each of the static needles 80 is determined by the calculation of the ideal engine rpm at the selected gear indicated by the particular needle 80. For example, a first static needle displays the ideal engine rpm at which twelfth gear will smoothly engage. A second needle displays the ideal transmission rpm at which ninth gear will smoothly engage. Together, the first and second gear engagement needles cover a range of vehicle road speed from 21 to 65 mph without the engine speed falling below 1100 or exceeding 2100 rpm. During operation, the driver will adjust the engine speed so that the rpm indicating needle 44 matches that of one of the static needles 80 to smoothly mesh the transmission 24 into that particular gear.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A method to facilitate smooth gear meshing in vehicles that require substantially synchronized mating transmission gear speeds for gear meshing, comprising the steps of:
   ascertaining rotational speed of the vehicle drive shaft and automatically selecting a recommended gear based on the available transmission gear ratios;
   calculating the ideal engine rpm based on said selected recommended gear; and
   informing the driver of said recommended gear and said ideal engine rpm, whereby the operator adjusts the engine rpm to substantially match said ideal engine rpm to smoothly engage the vehicle in said recommended gear.

2. The method of claim 1, wherein said step of calculating said ideal engine rpm further includes the steps of:
   multiplying the vehicle drive shaft rotational rpm by the gear ratio of said recommended gear to ascertain said ideal engine rpm.

3. The method of claim 1, wherein said step of automatically selecting a recommended gear includes the steps of:
   predefining a plurality of vehicle road speed ranges, each range corresponding to a particular recommended gear of the transmission; and
   selecting a recommended gear from said predefined plurality of ranges based on said ascertained vehicle road speed.

4. The method of claim 1, wherein said step of informing the operator includes the step of: displaying on a tachometer the recommended gear, said tachometer having a first needle for indicating engine rpm, and a second needle for indicating said ideal engine rpm.

5. The method of claim 1, wherein said step of informing the operator includes the step of: displaying on a digital display arranged on a tachometer face the recommended gear, said tachometer having a first needle for indicating engine rpm, and a second digital display arranged on said tachometer face indicating ideal engine rpm.

6. The method of claim 1, wherein said step of informing the operator of said recommended gear includes the step of;

displaying at least one indicator for informing the system operator of said ideal engine rpm at a particular gear, whereby said indicator informs the operator of the recommended engine speed to properly engage the vehicle in said particular gear.

7. A system to facilitate correct gear selection, ease in meshing transmission gears and smooth engagement of the clutch in vehicles that require substantially synchronized transmission mating gear rpm for correct gear meshing, comprising:

means for ascertaining vehicle road speed;

means for automatically selecting a recommended gear based on said vehicle speed; and means for informing the operator of said recommended gear and the engine rpm for said recommended gear, whereby the operator is able to adjust the engine rpm to substantially match said ideal engine rpm, and to smoothly engage the vehicle in said recommended gear.

8. The system of claim 7, wherein said processor further maintains in processor memory a predefined plurality of vehicle speed ranges, each range corresponding to a particular recommended gear of the vehicle, said processor selecting a recommended gear from said predefined plurality of ranges based on the vehicle speed.

9. The system of claim 7, wherein said means for informing include a tachometer having a first needle for indicating engine rpm, and a second needle for indicating said recommended engine rpm, whereby the operator adjusts the engine rpm until said first needle and said second needle are substantially in the same position to properly engage the vehicle into the recommended gear.

* * * * *